Oct. 5, 1954 D. RAGLAND 2,690,823
COMPRESSED AIR CONTROL SYSTEM FOR POWER TRANSMISSION UNIT
Filed April 1, 1950 4 Sheets-Sheet 1

FIG. 1.

INVENTOR.
Douglas Ragland,
BY
*J. S. McKean*
ATTORNEY.

Patented Oct. 5, 1954

2,690,823

UNITED STATES PATENT OFFICE 2,690,823

COMPRESSED AIR CONTROL SYSTEM FOR POWER TRANSMISSION UNIT

Douglas Ragland, Houston, Tex., assignor, by mesne assignments, to Standard Oil Development Company, Elizabeth, N. J., a corporation of Delaware Application April 1, 1950, Serial No. 153,425

9 Claims. (Cl. 192—.098)

This application is directed to a compressed air control system for a power transmission unit powered by a plurality of internal combustion engines.

The control system of this application is particularly adapted for a rotary drilling rig. It enables an operator to control readily the operation of a drilling unit powered with three internal combustion engines and having three power-receiving units, such as two mud pumps and a drawworks, with mechanical connections arranged for transmitting power from the engines to the power-receiving units.

Other advantages of the present invention will be more fully understood from a reading of the following description taken in conjunction with the drawings, in which.

In the description of the drawing Roman numerals are employed to designate timing devices in the compressed air control system. Capital letters are used to designate parts of the mechanical system and important parts of the compressed air system and Arabic numerals are used to designate other parts of the system.

Figure 1:
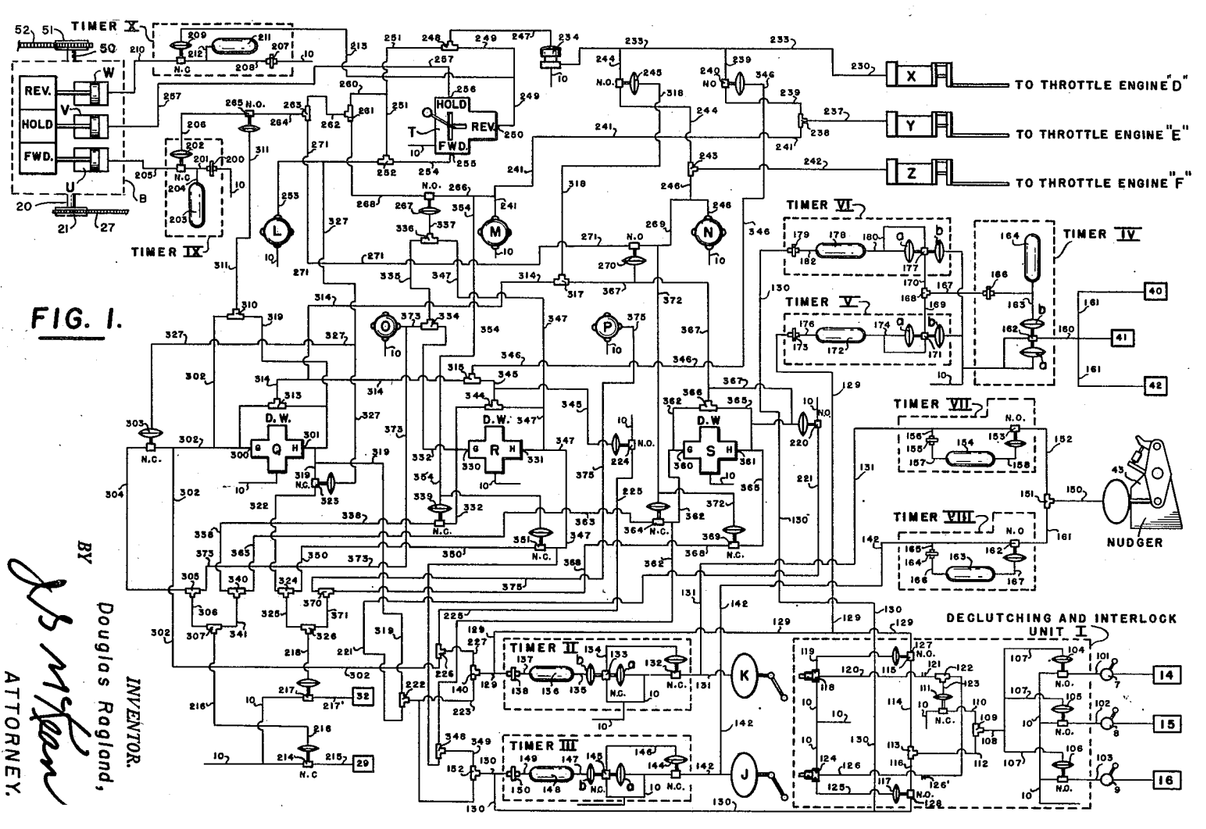
Fig. 1 is in the form of a diagrammatic flow sheet showing an application of the system for controlling the operation of certain units in a drilling rig.
Figure 2:
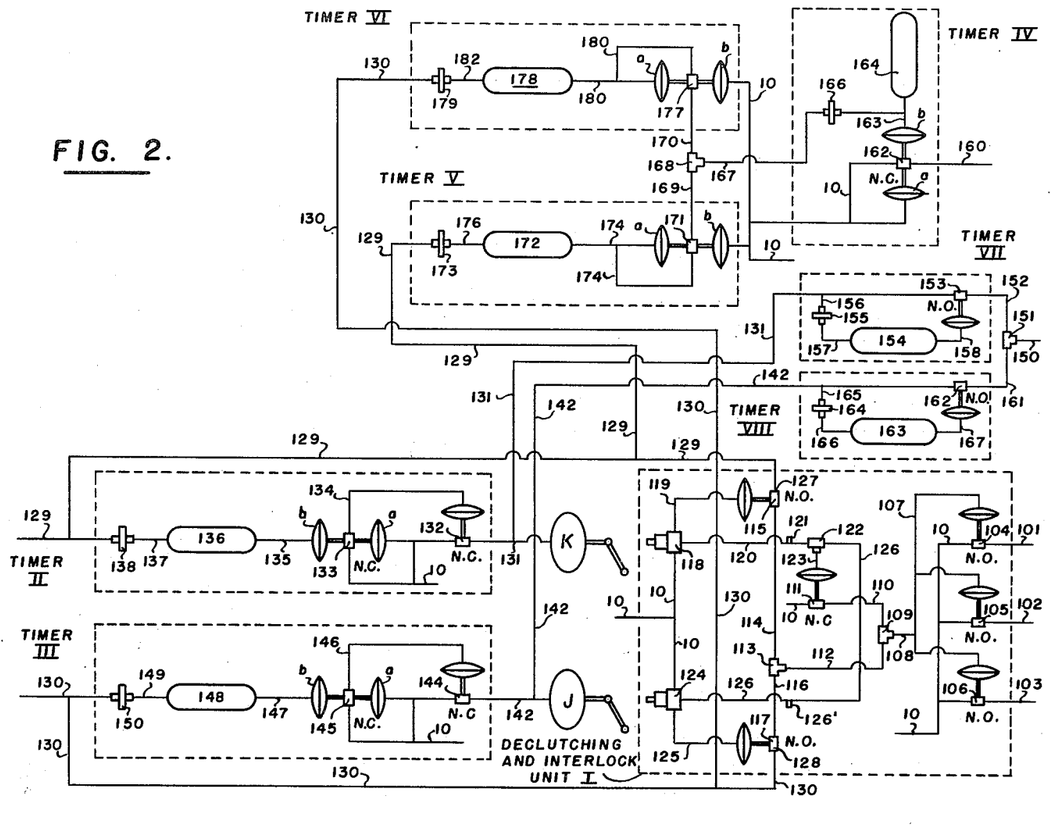
Fig. 2 is in the form of a diagrammatic flow sheet showing in a larger scale a portion of the system of Fig. 1.
Figure 3:
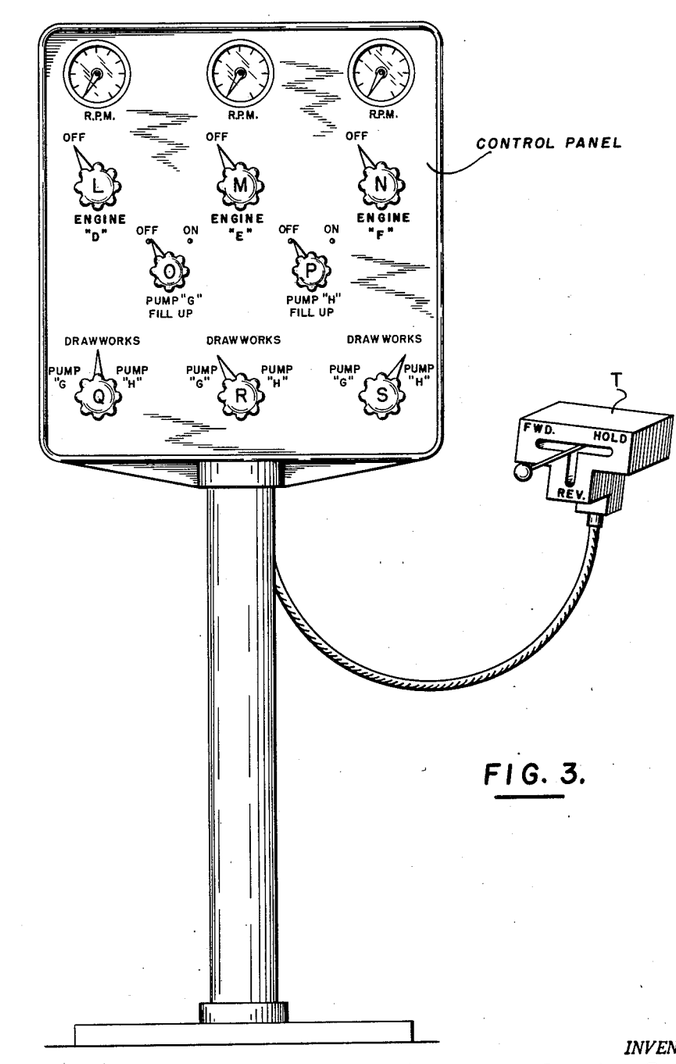
Fig. 3 is a front elevation showing a control panel and an auxiliary throttle valve which may conveniently be used for mounting the mechanically controlled valves shown in Fig. 1.

Turning now specifically to the drawing and first to Figs. 1 and 2, the system shown may be described generally as a compressed air control system; that is to say, signals are transmitted by means of changes in the pressure of air transmitted through pilot lines. In order to simplify the drawings a means for providing the compressed air are not shown, the compressed air being introduced into the system through a number of air inlet lines and a number of air inlet manifolds; since these air inlet lines and manifolds all represent a means for supplying compressed air they are all designated by the number 10.

Arranged in the system is a unit designated as a declutching unit and interlock I. Also arranged in the system are units designated as timing devices, the system having timing devices II, III, IV, V, VI, VII, VIII, IX and X.

Figure 4:
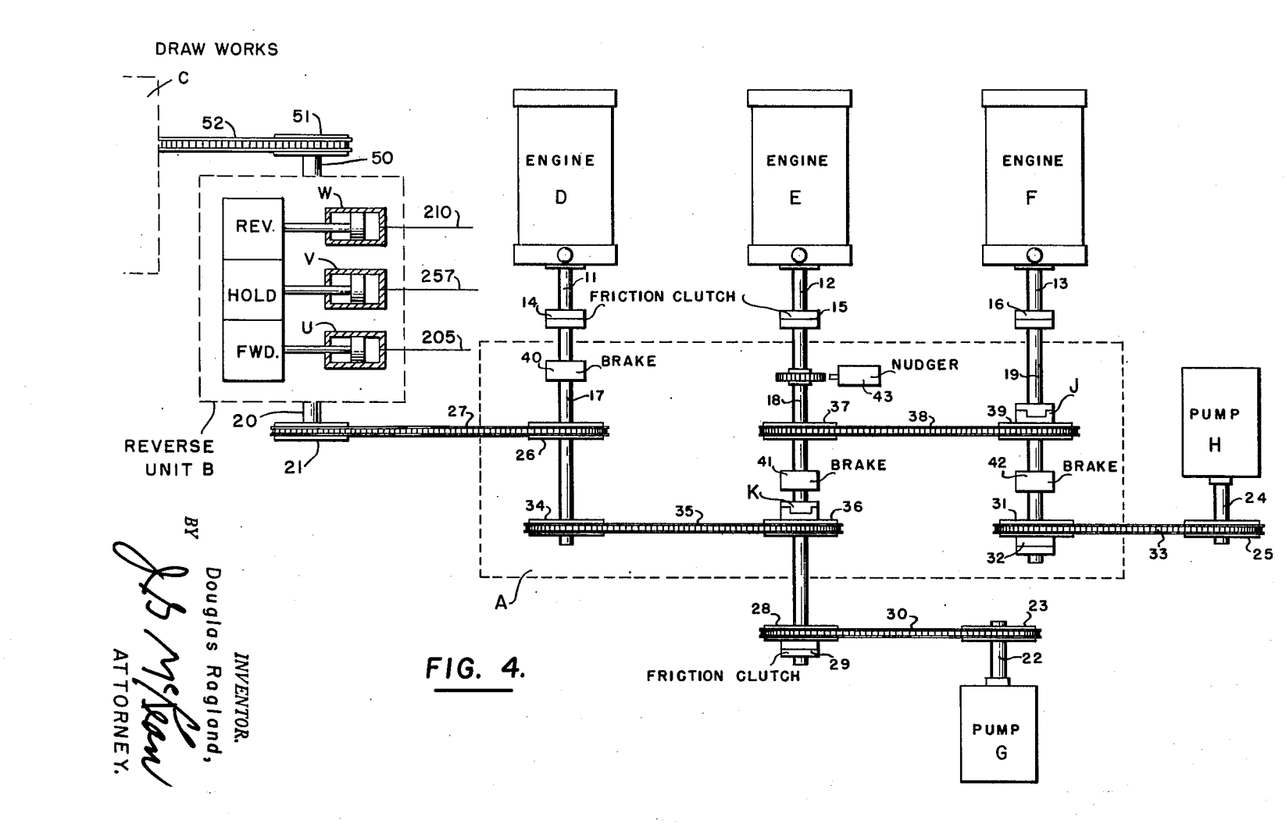
Fig. 4 is in the form of a top schematic view illustrating the mechanical equipment which the control system of the preceding figures is adapted to control.

In Fig. 4 the important parts of the mechanical equipment are designated by letters. These parts are compound unit A, reverse unit B, drawworks C, drilling engines D, E, and F, and mud pumps G and H. Within the compound unit A are arranged two jaw clutches J and K.

Units I through VIII, inclusive are arranged to cause the proper sequence of jaw clutches J and K when connecting and disconnecting the several prime movers with the power receiving units. Timers IX and X are used to insure the smooth operation of the clutches of reverse unit B.

In order to simplify the description, the various valves in the drawing are designated by the letters NC if the valves are normally closed and by NO if the valves are normally open.

*Mechanical units A through H, inclusive*

Engines D, E, and F are connected to compound unit A by shafts 11, 12 and 13, respectively. These shafts in turn are provided with friction clutches 14, 15, and 16.

Within the compound unit are the three parallel shafts 17, 18, and 19. Shaft 17 is coaxial with engine shaft 11, shaft 18 is coaxial with engine shaft 12, and shaft 19 is coaxial with engine shaft 13.

Reverse unit B is driven through shaft 20 provided with sprocket 21 which in turn drives drawworks C by means of shaft 50, sprocket 51 and chain 52. Pump G is driven through shaft 22 provided with sprocket 23, and pump H is driven through shaft 24 provided with sprocket 25. A sprocket 26 is mounted on shaft 17 in compound A and arranged to drive sprocket 21 of the reverse unit B through chain 27. A sprocket 28 is mounted on shaft 18 in compound A and is connected to this shaft through friction clutch 29 and is arranged to drive sprocket 23 of pump G through chain 30. A sprocket 31 is mounted on shaft 19 of compound A and is connected to this shaft through friction clutch 32 and is arranged to drive sprocket 25 of pump H through chain 33.

Within compound unit A, a sprocket 34 is mounted on shaft 17 and by chain 35 drives sprocket 36 which is mounted on shaft 18 and is releasably engaged thereto through jaw clutch K. A sprocket 37 is secured to shaft 18 and by chain 38 transmits power to sprocket 39 which is mounted on shaft 19 and may be engaged therewith through jaw clutch J.

Within compound unit A an inertia brake 40 is mounted on shaft 17, an inertia brake 41 is mounted on shaft 18, and inertia brake 42 is mounted on shaft 19. A device conveniently referred to as a nudger or kicker, such as described and claimed in detail in the application filed in the name of Robert R. Crookston entitled Device for Giving Shaft Angular Movements, Serial No. 175,360, filed July 22, 1950, now U. S. Patent No. 2,563,584, issued August 7, 1951, mounted on shaft 18 and designated as 43.

*Compressed air units I through VIII, inclusive*

The compressed air control control system used for the engagement and disengagement of the several friction clutches 14, 15, 16, 29, and 32, jaw clutches J and K, brakes 40, 41, and 42 and the operation of nudger 43 will now be described particularly with reference to Figs. 1 and 2.

Declutching unit and interlock I may be described generally as a mechanism which acts immediately to disengage the clutches of engines D, E, and F upon receiving a compressed air signal and which acts to engage the clutches of engines D, E, and F upon receiving a mechanical signal from either jaw clutch J or K and after the desired operation is completed. Timers II and III are time delay mechanisms each of which passes a compressed air signal after a predetermined but different lapse of time. Timer IV is a time delay mechanism which passes a signal after a predetermined lapse of time and timers V and VI which cooperate with timer IV are time delay mechanisms which release timer IV and return it to its initial position after a predetermined lapse of time. Timers VII and VIII are also release timers in that they pass a signal immediately but cut it off and release after a predetermined lapse of time.

The outlet of declutching unit and interlock I is connected through lines 101, 102, and 103, respectively, to the compressed air operated friction clutches 14, 15, and 16, respectively, of engines D, E, and F. Lines 101, 102, and 103 are provided with manually operated valves 7, 8, and 9, respectively. The compressed air is supplied to the lines 101, 102, and 103 through air supply inlet 10 and the flow of air through lines 101, 102, and 103 is controlled respectively by the normally open diaphragm valves 104, 105, and 106. The diaphragm valves 104, 105, and 106 are connected by manifold 107 and line 108 to the outlet of double check valve 109. One inlet of double check valve 109 is connected through line 110, controlled by normally closed diaphragm valve 111 to air supply line 10. The other inlet of double check valve 109 is connected through branch line 112 to the outlet of double check valve 113. One inlet of double check valve 113 is connected through line 114 to the outlet of diaphragm operated valve 115 and its other inlet is connected through line 116 to the outlet of normally open diaphragm operated valve 117. A three-way mechanically operated valve 118, which is activated by movement of the clutch K as it is engaged, has one outlet connected through line 119 to the diaphragm of diaphragm valve 115 and its other outlet connected by line 120, which has a bleeder outlet 121, to an inlet of double check valve 122. The outlet of double check valve 122 is connected by line 123 to the diaphragm of diaphragm valve 111. A three-way mechanically operated valve 124, which is identical to valve 118, has one outlet connected through line 125 to the diaphragm of diaphragm operated valve 117 and its other outlet connected through line 126 which has a bleeder outlet 126' to an inlet of double check valve 122. Mechanically operated three-way valve 124 is activated by movement of clutch J when it is engaged. Compressed air is supplied to the inlets of valves 118 and 124 through air inlet line 10. In effect declutching unit and interlock I has two inlets, the inlet 127 of valve 115 and inlet 128 of valve 117; the inlet of valve 115 is connected to manifold 129 and the inlet of valve 117 is connected to manifold 130.

The outlet of timer II is connected through manifold 131 to compressed air operated jaw clutch K and to timer VII. Manifold 131 is connected to the outlet of diaphragm valve 132 which valve has its inlet side connected to compressed air supply manifold 10. Double diaphragm valve 133 has its diaphragm *a* and inlet supplied with compressed air by air supply manifold 10. Its outlet is connected through line 134 to the diaphragm of diaphragm operated valve 132. Diaphragm *b* of double diaphragm valve 133 is connected through line 135 to container 136 which in turn is connected through line 137 to the outlet of orifice member 138. The inlet of orifice 138 is connected through manifold 129 to the outlet of double check valve 140. The outlet of double check valve 140 is connected not only to timer II but also through manifold 129 to inlet 127 of declutching unit and interlock I and further through manifold 129 to the inlet of timer V.

The outlet of timer III is connected through manifold 142 to compressed air actuated jaw clutch J and to the inlet of timer VIII.

Timer III consists of a diaphragm valve 144 having its outlet connected to manifold 142 and supplied with compressed air through air supply manifold 10. A double diaphragm valve 145 has its diaphragm *a* and its inlet supplied with compressed air through air supply manifold 10. The outlet of double diaphragm valve 145 is connected by line 146 to the diaphragm of diaphragm valve 144. Diaphragm *b* of double diaphragm valve 145 is connected through line 147 to vessel 148 which in turn is connected through line 149 to the outlet of orifice member 150. The inlet of orifice member 150 is connected through manifold 130 to the outlet of double check valve 152 to inlet 128 of declutching unit and interlock I and to the inlet of timer VI.

Timer IV consists of double diaphragm valve 162, container 164 and orifice member 166. The outlet of valve 162 (which is the outlet of the timer IV) is connected by outlet line 160 to manifold 161 which in turn is connected to brakes 40, 41, and 42 of compound unit A. The inlet of double diaphragm valve 162 and diaphragm *a* thereof is supplied with compressed air by air supply manifold 10. Diaphragm *b* of double diaphragm valve 162 is connected through manifold 163 to container 164 and to the outlet of orifice member 166. The inlet of orifice 166 is the inlet of timer IV and is connected through line 167 to the outlet of double check valve 168. One inlet of double check valve 168 is connected through line 169 to the outlet of timer V and the other inlet of double diaphragm valve 168 is connected through line 170 to the outlet of timer VI.

Timer V consists of double diaphragm valve 171, container 172 and orifice member 173.

Compressed air is supplied to diaphragm *b* of diaphragm valve 171 to air supply manifold 10. The inlet of diaphragm valve 171 is connected through manifold 174 to diaphragm *a* of diaphragm valve 171 and to container 172. Container 172 is connected through line 176 to the outlet of orifice member 173. The inlet of orifice member 173, which is the inlet for timer V, is connected to line 141.

Timer VI consists of double diaphragm valve 177, container 178 and orifice member 179. Compressed air is supplied to diaphragm *b* of double diaphragm valve 177 by air supply manifold 10. The inlet of double diaphragm 177 is connected through manifold 180 to diaphragm *a* of said diaphragm valve 177 and to container 178. Container 178 is connected through line 182 to the outlet of orifice member 179. The inlet of orifice member 179, which is the inlet of timer VI, is connected to line 134.

The timers IV, V, and VI form a cooperating group. Timer V is connected to one inlet of double check valve 168 and VI to the other inlet of this check valve. The outlet of check valve 168 connects to the inlet of timer IV. If a signal is transmitted through line 141 to timer V this signal passes through timer V after a short delay and through double check valve 168 to timer IV so that in effect the signal from line 141 is imposed through timer V to IV. Similarly, if a signal is imposed through line 134 on the inlet of timer VI the signal passes through timer VI after a short delay and through double check valve 168 to timer IV so that in effect the signal passed through line 134 is imposed through timer VI on timer IV. The arrangement whereby the outlets of timers V and VI are connected through double check valve 168 to timer IV insures that when signals are transmitted at about the same time through both lines 134 and 141 the signal which first reaches check valve 168 takes command so that timer IV responds to the first received signal.

The nudger 43 is connected through line 150 to the outlet of double check valve 151. One inlet of double check valve 151 is connected via line 152 to the outlet of timer VII. The other inlet of double check valve is connected by line 161 to timer VIII.

Timer VII consists of normally open diaphragm valve 153, chamber 154 and orifice member 155. The inlet side of diaphragm valve 153 is connected to line 131 and its outlet is connected to line 152. The inlet of orifice member 155 is connected by line 156 to line 131 and its outlet is connected by line 157 to chamber 154 which in turn is connected through line 158 to the diaphragm of diaphragm valve 153.

Timer VIII consists of diaphragm valve 162, chamber 163 and orifice member 164. The inlet of diaphragm valve 162 is connected to line 143 and its outlet is connected to line 161. Line 165 connects line 143 with the inlet of orifice member 164. Line 166 connects the outlet or orifice member 164 with chamber 163 and line 167 connects chamber 163 with a diaphragm of diaphragm valve 162.

The cooperation of the several units I through VIII when actuating jaw clutches J and K separately and together will now be described.

*Actuation of jaw clutch K*

Assume that an impulse is transmitted from some source through double check valve 140 to line 139. At this point the line is branched so that an impulse is imposed through line 127 to declutching unit and interlock I, and an impulse is also transmitted through line 127 and line 141 to timer V and thence to timer IV and an impulse is also imposed upon timer II. When such signal impulses are transmitted, the first action obtained is the passing of an impulse in unit I through normally open diaphragm valve 115, line 114, double check valve 113, line 112, double check valve 109, line 108, manifold 107 and normally open diaphragm valves 104, 105, and 106. This impulse closes the valves 104, 105, and 106 which are of the bleeder type and thus they bleed the air from the clutches 14, 15, and 16 and disengage the clutches of the engines D, E, and F. The next result from the signal is the passing of an impulse by lines 127 and 141 through timer V, from timer V to double check valve 168 and thence to timer IV, the impulse passing into timer IV exerting pressure on diaphragm *b* of double diaphragm valve 162 which opens this valve and allows compressed air to be applied through line 160 and manifold 161 to apply the inertia brakes 40, 41, and 42 of combination unit A. When the impulse is first imposed through timer V onto timer IV the compressed air passes through double diaphragm valve 171 which is normally open but as the pressure builds up in container 172 and diaphragm of valve 171 of timer V the pressure imposed on diaphragm *a* of double diaphragm valve 171 causes this valve to close and as this valve closes, since it is the bleeder type, it bleeds off pressure from the timer IV (through line 167, double check valve 168 and line 169) and when sufficient air pressure is withdrawn from chamber 164 and from diaphragm *b* of double diaphragm valve 162 of timer IV, the double diaphragm valve 162 closes and bleeds off pressure through line 160 and manifold 161 from the brakes 40, 41, and 42 of compound unit A thus releasing these brakes. The next action obtained is the transmission of a signal through timer II. This signal is transmitted through orifice member 138, line 137, chamber 136, and line 135 where it is imposed upon diaphragm *b* of double diaphragm valve 133. This causes normally closed double diaphragm valve 133 to open so that compressed air fed from air supply manifold 10 passes through this valve and is imposed through line 134 to the diaphragm of valve 132 in turn opening it so that compressed air from air supply manifold 10 passes through valve 132 and line 130 to compressed air actuated clutch K of compound unit A and through valve 132 and lines 130, 131 and through valve 153 of timer VIII to actuate nudger 43. After the signal has been imposed a short time on timer VII, the compressed air passes through line 156, orifice 155, line 157, container 154 and line 158 imposes a sufficient pressure on the diaphragm of diaphragm valve 153 to close this normally open valve. The closing of valve 153 terminates any further effect of this on nudger 43. The signal imposed on air actuated jaw clutch K causes this clutch to engage. Movement of this clutch actuates three-way valve 118 of declutching unit and interlock I. As valve 118 is actuated it allows air pressure to be imposed through line 119 onto the diaphragm of normally open valve 115 which is of the bleeder type, thus closing this valve which in turn cuts off the supply of air through line 114, double check valve 113, line 122, to an inlet of double check valve 109 and bleeds out air pressure from these lines. At the same time valve 115 is closed, air pressure is imposed through line 120 (containing bleeder 121) through double check valve 122 onto the diaphragm of normally closed diaphragm valve 111. This pressure opens valve 111 so that air pressure passes from air supply line 10 through valve 111, line 110, double check valve 109, line 108 and manifold 107 to the diaphragms of normally open valves 104, 105, and 106 which have previously been closed to disengage the clutches 14, 15, and 16. Thus, the initial effect of the actuation of valve 118 by clutch K is simply to change the command of valves 104, 105, and 106 from air pressure imposed through line 112 on one side of double check valve 109 to the pressure imposed on line 110 of this double check valve, the clutches 14, 15, and 16 remaining disengaged. However, with the lapse of time, air pressure is bled through from line 120 by bleeder 121 and this reduced pressure allows valve 111 to close and on closing it bleeds pressure from the manifold 107 through line 108, double check valve 109 and line 110 thus allowing valves 104, 105, and 106 to open so that compressed air again passes from manifold 10 to clutches 14, 15, and 16 and causes these clutches to engage.

From the description given it will be seen that as a sequence of events the first effect is to disengage engine clutches 14, 15, and 16. The next step is to engage brakes 40, 41, and 42 of compound unit A and the next two steps taken simultaneously are to impose pressure on the contact portions of clutch K and rotate shaft 18 by nudger 43 so that one engaging portion of jaw clutch K is moved angularly while the two engaging portions are brought into contact to insure the sure and positive engagement of the jaw clutch K. The final step is the engagement of friction engine clutches 14, 15, and 16.

*Actuation of jaw clutch J*

If a signal is imposed through double check valve 152, it similarly actuates declutching unit and interlock I, is transmitted through timer VI to timer IV and also passes through timer III and is then imposed on jaw clutch J and through timer VIII to nudger 43. In this case the sequence of events is that the signal is first imposed on declutching unit and interlock I disengaging the friction engine clutches 14, 15, and 16. The next result is that the signal is imposed through timer VI on timer IV to set the inertia brakes 40, 41, and 42. The next effect is to actuate timer VI to release brakes 40, 41 and 42. Subsequently a signal passing through timer III is imposed simultaneously on air actuated jaw clutch J and through timer VIII on nudger 43 so that the two engaging portions of jaw clutch J are brought into contact while shaft 18 of compound unit A is rotated angularly to cause smooth and positive engagement of jaw clutch J. As a final step the friction engine clutches 14, 15, and 16 are engaged.

*Simultaneous actuation of jaw clutches K and J*

If signals are imposed simultaneously through double check valve 140 to line 139 and through check valve 152 to line 151, the following sequence of events is obtained. The signal is imposed immediately on declutching unit and interlock I through inlet line 127 and through inlet line 128. The signal imposed through line 127 passes through normally opened valve 115 and line 114 to one inlet of double check valve 113, while the other signal passes through normally opened valve 117 and line 116 to the other inlet of double check valve 113. The signal which first reaches an inlet of double check valve 113 takes command and passes through line 112, double check valve 109 and line 108 to manifold 107 and actuates valves 104, 105, and 106 to disengage the friction engine clutches 14, 15, and 16. A signal is imposed through lines 127 and 141, and timer V and on one inlet of double check valve 168, and a signal is also imposed through lines 128 and 134 and timer VI and on the other inlet of double check valve 168; the signal which first reaches double check valve 168 either through timer V or timer VI takes command and passes on to timer IV to engage brakes 40, 41, and 42 in the compound unit A. Then either timer V or timer VI (whichever passed the signal on to timer IV) assumes command and releases the brakes 40, 41 and 42. As the next effect a signal passes through timer II and is imposed simultaneously on air actuated jaw clutch K and through timer VII to nudger 43. As jaw clutch K engages it closes valve 118 of declutching unit and interlock I. If the signal previously imposed through line 127 on valve 118 had assumed command of declutching unit and interlock I, the effect of actuation of clutch K is to close valve 115 and bleed air through line 114 which action changes the command in unit I to the signal imposed through line 128 inasmuch as a signal continues to be imposed through line 128 and valve 127 on the other side of double check valve 113; this retains the engine clutches 14, 15, and 16 disengaged. If the signal imposed through line 128 originally took command of unit I, it simply retains command of unit I through the sequence of events engaging clutch K so in any event the result is the same, namely, engine clutches 14, 15, and 16 remain disengaged for the next series of events. The next effect is that a signal passes through timer III and is then simultaneously imposed on jaw clutch J and then timer VIII through nudger 43. This signal causes the engaging portions of jaw clutch J to be brought together which shaft 43 is moved angularly to cause proper engagement of the engaging portions of jaw clutch J. As jaw clutch J is engaged, it actuates valve 124 which then closes valve 117 and it also imposes a pressure through line 126 and double check valve 122 onto valve 111 causing it to open and changes the command of double check valve to valve 111 and as the pressure bleeds out through bleeder 127, valve 111 closes and bleeds out the pressure from valves 104, 105, and 106 allowing them to open so that compressed air is once again supplied to clutches 14, 15, and 16 and causes them to engage.

*A satisfactory time sequence for units I through VIII, inclusive*

As a time sequence which will be found satisfactory, consider the instant a signal is imposed through double check valve 140 as the initial time. This signal imposed on declutching unit and interlock I causes substantially immediate disengagement of clutches D, E, and F. The signal is passed through timers V and IV and causes the brakes 40, 41, and 42 to be set in about five seconds after the initial time. Timer V releases the brakes about 15 seconds after the initial time. About 20 seconds after the initial time the clutch K and nudger 43 are actuated and in about 25 seconds after the initial time (or five seconds after it receives the signal) timer VII acts to discontinue the signal to nudger 43.

If the signal is imposed through double check valve 152 the signal should require a few more seconds to pass through timer III than is required for a signal to pass through timer II, that is, it may require 30 seconds to pass through timer III. Timer VIII, like timer VII, passes its impulse directly to nudger 43 and acts about five seconds later to discontinue the signal. Thus, if signals are simultaneously imposed through double check valves 140 and 152 there will be a time interval which allows jaw clutch K to be engaged first and jaw clutch J will then be engaged.

*The entire compressed air control system*

The arrangement of the declutching unit and interlock I and timers II, III, IV, V, VI, VII and VIII which are shown in Fig. 2 and the operation heretofore described are advantageously used in the complete system as shown in Fig. 1.

In Fig. 1 the manually controlled valves are identified as valves L, M, N, O, P, Q, R, S, and T. The system also includes friction clutches U, V, and W for the reverse unit B and throttle controls X, Y, and Z for engines D, E, and F.

The valves Q, R, and S are the control valves which control the way power is transmitted from the engines D, E, and F to the power receiving units B, G, and H. Each valve Q, R, and S has two outlets which are identified in Fig. 1 as G and H. The letter G signifies the transmission of power to pump G and H signifies the transmission of power to pump H. Valves Q, R, and S each have letters DW; when the valves have this setting they are closed but the letters signify in general that at such a setting of valves Q, R, and S power is transmitted from engines D, E, and F, respectively, through units A and B to drawworks C.

Timers IX and X are arranged to control the admission of compressed air operated to compressed air clutches U and W, respectively, of reverse unit B. These timers insure the smooth operation of these clutches.

Timer IX consists of an orifice member 200 having its inlet connected to an air supply manifold 10. Its outlet is connected through line 201 to the inlet of normally closed diaphragm valve 202. A chamber 203 is connected to line 201 by line 204. The outlet of diaphragm valve 202 is the outlet of the timing unit and is connected through line 205 to clutch U. The operation of the timer unit IX is controlled by air pressure imposed through line 206 on the diaphragm of diaphragm valve 202.

Timer X consists of an orifice member 207 having its inlet connected to air supply manifold 10 and its outlet connected by line 208 to the inlet of diaphragm valve 209. The outlet of diaphragm valve 209 is the outlet of the timer and is connected through line 210 to clutch W of the reverse unit. Chamber 211 is connected to line 208 by line 212. The operation of timer X is controlled by air pressure imposed through pilot line 213 on the diaphragm of diaphragm valve 209.

Timer IX has chamber 203 in communication with air supply manifold 10 through the orifice member 200. With valve 202 closed, the pressure in chamber 203 comes into equilibrium with the pressure in the air supply manifold 10. Clutch U is a compressed air operated clutch requiring compressed air at approximately the pressure in air supply line 10. Chamber 203 and clutch U are proportioned so that chamber 10 holds almost but not quite enough to actuate clutch U. Accordingly, when valve 202 of timer IX is opened the high pressure air from chamber 203 rushes into clutch U and rapidly brings the engaging portions of the clutch into close proximity but the final engagement of these members is accomplished by the high pressure air which must pass from manifold 10 to orifice 200 and open valve 202 into clutch U. The use of chamber 203 to supply most of the compressed air for filling clutch U would require an additional amount leading through orifice member 200 which insures the smooth operation of clutch U.

Timer X and clutch W are proportioned in exactly the same way as timer IX and clutch U. Here again the arrangement of chamber 211 which supplies most of the air required to actuate clutch W with additional air leaking through orifice member 207 and passing through open valve 209 to bring the engaging portions of members W into contact for completing the engagement of clutch W insures the smooth actuation of this clutch.

The combination of a compressed air timing device and compressed air actuated clutch with the volumes proportioned as are the volumes of timer IX and clutch U and as are the volumes of timer X and clutch W is being claimed in the divisional application of the present case Serial No. 230,898, filed June 11, 1951.

The supply of air to air operated pump clutch 32 is controlled by diaphragm valve 217. The inlet of valve 217 is connected to air supply manifold 10 and its outlet is connected by line 218 to clutch 32. Valve 217 is normally closed and its actuation is controlled by air pressure imposed through pilot line 218 connected to its diaphragm.

Valve T is a three-way manually operated valve allowing air from air supply line 10 to be applied, at the option of the operator to either clutch U, V or W of reverse unit B. Valve T is supplied with air through air supply line 10. In the drawing outlet 255 through which air is supplied to clutch U has legend FWD applied thereto, outlet 250 through which air is supplied to clutch W has the legend REV and outlet 256 through which air is supplied to clutch V has the legend HOLD.

Normally open valve 220 has its inlet connected to air supply line 10 and its outlet connected to both double check valves 140 and 152 which in turn supply compressed air to units I, II, III, IV, V, VI, VII, and VIII as heretofore described. The outlet of valve 220 is connected through line 221 to an inlet of double check valve 222. The outlet of double check valve 222 is connected through branched line 223 to an inlet of double check valve 140 and to an inlet of double check valve 152.

Normally open diaphragm valve 224 is connected to double check valve 140 and thence through units I, II, V, VI and VII. The outlet of valve 224 is connected through line 225 to an inlet of double check valve 226. The outlet of double check valve 226 is connected through line 227 to an inlet of double check valve 140.

Throttle control X of engine E is connected to air supply 10 as follows: branch line 230 connects throttle X with line 233 which in turn is connected with an outlet of relay valve 234 whose inlet is connected to air supply line 10.

Throttle control Y of engine E is connected to line 237 to the outlet of double check valve 238. One inlet of double check valve 238 is connected through line 239, controlled by normally open diaphragm operated valve 240 to line 233 which in turn is connected to an outlet of relay valve 234. The other inlet of double check valve 238 is connected through line 241 to manually operated valve M.

Throttle control Z of engine F is connected through line 242 to the outlet of double check valve 243. One inlet of double check valve 243 is connected by line 244 controlled by normally open diaphragm valve 245 with line 233 which in turn is connected with the outlet of relay valve 234. The other inlet of double check valve 243 is connected through line 246 with valve N.

The operation of relay valve 234 may be controlled either by valve T or by valve L. This valve is controlled by air pressure imposed by pilot line 247 which is connected to the outlet of double check valve 248. One inlet of double check valve 248 is connected by line 249 to outlet 250 (REV) of valve T. The other inlet of double check valve 248 is connected by line 251 to the outlet of double check valve 252 and one inlet of double valve 252 is connected by line 253 to valve L. The other inlet of double check valve 252 is connected by line 254 to outlet 255 (FWD) of valve T.

Outlet 256 (HOLD) of valve T is connected through line 257 to clutch V of reverse unit "B." The line of connection of valve L to relay valve 234 has been described. Valve L is also connected to timer IX through line 253, double check valve 252, line 251, branch line 260, double check valve 261, line 262, double check valve 263, line 264 and diaphragm valve 265 which has its outlet connected through line 206 to valve 202 of timer IX.

The fluid connection between valve M and throttle control Y of engine E has been described. This valve is also connected to timer IX through line 241, branch line 266, normally open diaphragm valve 267, line 268, double check valve 261, line 262, double check valve 263, line 264, valve 265, and line 206.

The fluid connection between valve N and throttle control Z of engine F has been described. This valve is also connected to timer IX through lines 246, 269, normally open diaphragm valve 270, line 271, double check valve 263, line 264, valve 265 and line 206. Valve N is also connected to the diaphragms of normally closed diaphragm valves 364 and 269 by lines 246, 269, and branched line 372.

Valve Q is connected with air supply line 10 and has outlet ports 300 (G) and 301 (H). Outlet port 300 is connected through manifold 302 to normally closed diaphragm valve 303, to an inlet of double check valve 310, to an inlet of double check valve 313 and to an inlet of double check valve 225. Diaphragm valve 303 is connected through line 304 to an inlet of double check valve 305 and the outlet of double check valve 305 is connected by line 306 to an inlet of double check valve 307. Double check valve 310 has its outlet connected through line 311 to the diaphragm of normally open diaphragm valve 265. The outlet of double check valve 313 is connected through manifold 314 to an inlet of double check valve 315 and to an inlet of double check valve 317. The outlet of double check valve 317 is connected through line 318 to the diaphragm of valve 245.

Valve Q has its outlet 301 connected by manifold 319 to an inlet of double check valve 222, to an inlet of double check valve 310, to an inlet of double check valve 313 and to the inlet of normally closed diaphragm valve 323. The outlet of diaphragm valve 323 is connected to an inlet of double check valve 324. The outlet of double check valve 324 is connected through line 325 to an inlet of double check valve 326.

Normally closed diaphragm valve 303 which controls flow of air from outlet 300 of valve Q and manifold 302 to line 304 and diaphragm valve 323 which controls the flow of air from outlet 301 of valve Q and manifold 319 to line 322 are both controlled by branched pilot line 327 which is connected through line 253 to valve L.

Valve R has outlet 330 (G) and 331 (H). Outlet 330 is connected through manifold 332 to an inlet of double check valve 334, to the inlet of diaphragm valve 339 and to an inlet of double check valve 344. The outlet of double check valve 334 is connected through line 335 to an inlet of double check valve 336. The outlet of double check valve 336 is connected through line 337 to the diaphragm of normally opened diaphragm valve 267. Normally closed diaphragm valve 339 is connected by line 338 to an inlet of double check valve 340. The outlet of double check valve 340 is connected through line 341 to an inlet of double check valve 307. The outlet of double check valve 344 is connected through branched line 345 with an inlet of double check valve 315 and with the diaphragm of normally open diaphragm valve 224. The outlet of double check valve 315 is connected through line 346 with the diaphragm of normally open diaphragm valve 240.

The outlet 331 of valve R is connected through manifold 347 with an inlet of double check valve 348, to an inlet of diaphragm valve 351, to an inlet of double check valve 344 and to an inlet of double check valve 336. The outlet of double check valve 348 is connected by line 349 to an inlet of double check valve 152. Diaphragm valve 351 is connected by line 350 to an inlet of double check valve 324.

Normally closed diaphragm valve 339 which controls the flow of air from outlet 330 of valve R and manifold 332 into line 338 and normally closed valve 351 which controls the flow of air from outlet 331 of valve R and manifold 347 into line 350 are both controlled by branched pilot line 354 which is connected by line 266 and line 241 to valve M.

Valve S has outlets 360 (G) and 361 (H). Outlet 360 is connected through manifold 362 to one side of double check valve 248, to the inlet of diaphragm valve 364 and to an inlet of double check valve 366. Normally closed diaphragm valve 364 is connected by line 363 with one inlet of double check valve 340. The outlet of double check valve 366 is connected by branched line 367 to the diaphragm of normally open diaphragm valve 220, to the diaphragm of normally open diaphragm valve 270 and to an inlet of double check valve 317.

The outlet 361 of valve S is connected by manifold 365 to the inlet of normally closed diaphragm valve 369 and to an inlet of double check valve 366. Diaphragm valve 369 is connected by line 368 to an inlet of double check valve 370. The outlet of double check valve 370 is connected through line 371 to an inlet of double check valve 326.

Normally closed diaphragm valve 364, which controls the flow of air from outlet 360 of valve S through manifold 362 and line 363 and normally closed diaphragm valve 369 which controls the flow of air from valve S through outlet 361, manifold 365 and line 368 are both controlled by branched pilot line 372 which is connected by lines 269 and 246 to valve N.

The valve O has its inlet connected to air supply line 10 and its outlet connected through manifold line 373 to one inlet of double check valve 334 and to an inlet of double check valve 305.

Valve P has its inlet connected to air supply line 10 and its outlet connected through line 375 to an inlet of double check valve 370.

*Operation of the entire system*

The use of the control mechanism in the operation of the mechanical equipment shown in Fig. 4 will now be described.

It is to be noted that as long as valve R is closed, that is, set at the DW position, diaphragm valve 224 which is normally open remains open and allows compressed air to be supplied to the several units I, II, IV, V, VIII and jaw clutch R. This insures that the jaw clutch K remains engaged as long as valve R is at the setting DW. This, of course, is necessary in order that power be transmitted mechanically from engine E through compound unit A and reverse unit B to drawworks C.

Similarly, as long as valve S is closed, that is, set at the DW position, normally open diaphragm valve 220 remains open and allows air to be supplied to the several units I, II, III, IV, V, VI, VII, VIII and jaw clutches K and J. This insures that both jaw clutches K and J remain engaged as long as valve S is at the setting DW. Both jaw clutches K and J must remain engaged in order to transmit power from engine F through compound unit A and reverse unit B to drawworks C.

If it be assumed that all three engines D, E, and F are to be used by operating the drawworks, as when pulling a string of drill pipe, the valves Q, R, and S are each closed, that is, they are set at the position DW. For controlling the speed of the operation, the driller has the choice of using valve L, which may be adjusted and left at a certain fixed adjustment or using the hand lever controlled valve T. If valve L is opened, air passes from valve L through line 353, double check valve 252 and line 251 where the stream is split with a portion going to timer IX (which controls clutch U of reverse unit C) via line 260, double check valve 261, line 262, double check valve 263, line 264, normally open diaphragm valve 265 and line 203 to the diaphragm of diaphragm valve 202 of timer IX, the other portion of the signal from valve L passes from line 251 through double check valve 248 and line 247 to relay valve 234 and opens this valve and in turn allows air to flow to each of the throttle controls X, Y, and Z of engines D, E, and F. The flow of air from relay valve 234 to the throttle control mechanism is from air inlet 10, valve 234, line 233 and branch line 230 to throttle control X, from line 233 through branch line 339 controlled by normally open valve 240, double check valve 238 and line 237 to throttle control Y and from line 233, branched line 244 controlled by normally open valve 245, double check valve 243 and line 242 to throttle control Z. Air pressure also passes from valve L through line 253 and branched line 327 to the diaphragms of diaphragm valves 303 and 323, but this has no effect in this case since valve Q is closed (that is, set at DW).

If, instead of operating valve L, the valve T is adjusted to connect air supply line 10 to outlet 255 (FWD) of this valve, the air passes through line 254 through double check valve 252 to line 251 giving exactly the same result as described with regard to the use of valve L.

If valve T is adjusted to connect air from air inlet 10 through outlet 250 (REV) a portion of air passes through line 249 to double check valve 248 and then through line 247 to relay valve 234 which admits air to the throttle controls X, Y, and Z as previously described in connection with valve L. In addition, air also passes from line 249 through branch line 213 to the diaphragm of valve 209 of timer X and opens the valve allowing compressed air to pass from timer X to clutch W of reverse unit C so that the reverse unit is shifted to its reverse position by this adjustment of valve T, at the same time air passes through throttle controls X, Y, and Z of the engines.

It will be seen that when the valves Q, R, and S are each set at the position DW, the manipulation of a single valve, either L or T, engages a clutch in the reverse unit C and also controls all three of the drilling engines D, E, and F. This is the normal use of the system when using the three engines for operating the drawworks.

The timer IX and X may be designed to operate at 5 pounds per square inch pressure and throttle controls X, Y, and Z at 20 pounds to 70 pounds per square inch. This allows the friction clutches to engage before the engines are speeded up.

*Operating pumps G and H while engines D, E, and F are operating the drawworks*

If the valves Q, R, and S are each set at DW and the drawworks is being used for pulling a string of drill pipe from the borehole, it is sometimes desirable to use one or the other of the mud pumps to pump drilling mud into the hole to put its level at a certain point. This preferably is done as the traveling blocks are being lowered in the derrick. If pump G is to be run while the three engines D, E, and F are compounded for operating the drawworks this result is obtained simply by opening valve O. Opening valve O allows air to pass from inlet line 10 through manifold 373, double check valve 305, line 306, double check valve 307 and line 216 to the diaphragm of normally closed diaphragm valve 214, opening this valve and allowing air to flow from air supply manifold 10 through line 215 to the air operated pump clutch 29 of pump G. If pump H is to be operated while the three engines D, E, and F are compounded for operating the drawworks this result may be obtained by opening valve P, which allows air to flow from air inlet line 10 through line 375, double check valve 370, line 371, double check valve 326 and a line 218 to the diaphragm of normally closed diaphragm valve 217 which causes this valve to open and allows air to pass from air inlet manifold 10 through line 217' to compressed air operated clutch 32 of pump "H," engaging this clutch so that pump H is operated. Thus either pump G or pump H or both may be operated while the three engines D, E, and F have their power compounded for operating the drawworks.

*Connecting engine D to the drawworks and engine E to pump G*

In the normal drilling operation while the drill pipe is being rotated the normal application of power is to use engine D for operating the drawworks with either engine E or F for operating pump G and H. Engines E and F may be disconnected from the combination unit A by closing hand operated valves 8 and 9, respectively. If it be assumed that engine F has been disconnected from the unit by disengaging clutch 16 through manual operation of valve 9 then engine E may be connected to operate pump G simply by setting valve R to supply air to its outlet 330 (G), opening valve M, setting valve Q at its setting DW and then opening either valve L or T. When valve R is set to its outlet 330 and valve M is opened this is the result. Air passes from valve M through line 241, double check valve 238 and line 237 to throttle control Y of engine E. Air also passes from valve M through line 241, line 266 and branch line 354 to the diaphragm of diaphragm valve 339 and opens its normally closed valve. The air passing from outlet 330 of valve R passes through line 332, double check valve 334, line 335, double check valve 336, and line 337 to diaphragm 267 and closes this normally open valve so that air pressure cannot pass from valve M to timer unit IX; in other words, with this setting of valve R, valve M is unable to engage clutch U of reverse unit C. Also air passes from valve R through outlet 330, manifold 332, double check valve 344, manifold 345, double check valve 315 and line 346 to the diaphragm of normally open diaphragm valve 240 and closes this valve; this prevents air from passing from the air relay valve 234, which is controlled by valve either L or T to the throttle control Y of engine E insuring that with this valve setting of valve R the operation of engine E is controlled by valve M. Air also passes from outlet 330 of valve R through manifold 33 and line 338 (valve 339 controlling flow of air in this line has been opened by the opening of valve M) and passes through double check valve 340, line 341, double check valve 307 and line 216 to the diaphragm of normally closed diaphragm valve 214 and opens this valve so that air can pass from air inlet manifold 10 to the air operated clutch 29 of pump G. Thus pump G is connected to engine E and the throttle of the engine E is controlled by this manipulation of valves R and M.

*Connecting engine E to pump H and engine D to the drawworks*

If engine E is to be used to drive pump H while engine D is applied to the drawworks, the valve Q is left at its setting DW, valve L or T manipulated as desired while the valve R is set to connect air inlet 10 with its outlet 331 and valve M is opened. The opening of valve M allows air to pass through line 241, double check valve 238 and line 237 to throttle control Y, thus controlling the speed of engine E. Air also passes from valve M through line 241, line 266 and branch line 354 to open diaphragm valve 351. Air passes from valve R through outlet 331, manifold 347, double check valve 336 and a line 337 to the diaphragm of normally open diaphragm valve 267 and closes this valve so that air is unable to flow from valve M to the timer IX. Air also passes from outlet 331 of valve R, manifold 347, double check valve 344 and branch line 345 to the normally open diaphragm valve 224 and closes this valve to cut off the supply of air through line 235, which is imposed on declutching and interlock I and timers II, IV, and V as long as valve R is set at DW. Air also passes from valve R through outlet 331, manifold 347, double check valve 344, manifold 345, double check valve 315 and line 346 where it is imposed on the diaphragm of normally open diaphragm valve 240 and closes this valve to prevent the flow of air from relay valve 234 (which is controlled by valve L or T) to the throttle control Y.

Air also passes from outlet 331 of valve R to engage jaw clutch J. This is accomplished by air passing from outlet 331 through manifold 347, double check valve 348, line 349, double check valve 152 to line 151 where a signal then passes to declutching unit and interlock I to timer III and through timer V to timer IV. As heretofore described, a signal is transmitted through timer III and is imposed simultaneously on jaw clutch J and nudger 43. As jaw clutch J is engaged it activates valve 124 of declutching unit and interlock I which sets into motion the series of events causing the engagement of clutches 14, 15, and 16 of engines D, E, and F, respectively.

Thus the effect of connecting valve R with outlet 331 and opening valve M while valve Q is set at DW is to engage clutch 24 of pump H and engage jaw clutch J while leaving jaw clutch K disengaged.

*Connecting engine D to the drawworks and engine F to pump G*

If engine D is to be used for operating the drawworks, engine E is taken out of service and engine F used for operating pump G this effect may be obtained by manually disengaging clutch 15 of engine E by closing valve 8, setting valve Q to DW, manipulating valve L or T, opening valve S to discharge through its outlets 360 (G) and opening valve N. The effect obtained by the setting of valve Q at DW and manipulating either clutch U or W of reverse unit C is engaged has been previously described. When valve N is opened air may pass through line 246, double check valve 243, line 242 and throttle control Z of engine F. Air also passes from valve N through lines 246, 269 and line 372 to the diaphragm of normally closed diaphragm valve 369 and opens this valve. In valve S air passes from outlet 360, manifold 365, double check valve 366 and into branch line 367 where a portion acts on diaphragm of normally open diaphragm valve 270 closing off this valve and preventing the flow of air from valve N to the timer unit IX; a portion of the air also is imposed through branch line 367 onto normally open diaphragm valve 220 and closes this valve. The effect of closing valve 220 is to cut off the supply of air which otherwise is imposed from air inlet line 10, valve 220, line 221, double check valve 222, branch line 223 and double check valves 152 and 140 onto the several units, declutching unit and interlock I and the timers II, III, IV, V, VI, VII and VIII. However, air passes from valve S from outlet 360, manifold 362, double check valve 348, line 349, double check valve 152 and thence to declutching unit and interlock I, timer III and through timer VI and timer IV. The cooperation of declutching unit and interlock I and timers III, IV, VI, jaw clutch J and timer VIII have been previously described. The effect is to engage jaw clutch J properly. Air also passes from valve S through outlet 306, manifold 362, valve 364 (which has been opened by opening valve NO and a line 363), double check valve 340, line 341, double check valve 307 and line 316 to the diaphragm of normally closed diaphragm valve 214 and opens this valve to allow air to flow from air inlet manifold 10 to clutch 29 of engine G, thus engaging this clutch.

It will be seen that the effect of setting valve Q at DW, manipulating valve either L or T and setting valve S to discharge through outlet 360 and opening valve N is to engage jaw clutch J, disengage jaw clutch K and engage friction clutch 29 of pump G.

Conclusion

It will be seen that the system of the present application insures the smooth and positive engagement and disengagement of the two jaw clutches K and J and compound unit A as desired by the operator. It will also be seen that the control system described allows the operator conveniently and effectively to apply power from a plurality of prime movers to a plurality of power consuming machines.

Having fully described and illustrated a preferred embodiment of the present invention, what I desire to claim as new and useful and to secure by Letters Patent is:

1. A compressed air actuating system for operating a power receiving and transmitting unit A which has a first rotating shaft 19 on which is mounted a first air actuated jaw clutch J and an air actuated brake 42, and a second rotating shaft 18 upon which is mounted a second air actuated jaw clutch K and an air actuated brake 41, and a first prime mover F is connected to said first shaft b ya first air actuated friction clutch 16 and a second prime mover E is connected to said second shaft by a second air actuated friction clutch 15 said compressed air actuating system comprising, in combination, a compressed air actuating means (declutching unit and interlock I) provided with a first mechanical linkage operated by said first air actuated jaw clutch and a second mechanical linkage operated by said second air operated jaw clutch and having a first inlet 128 and a second inlet 127 and adapted to disengage said first and second friction clutches upon receiving a predetermined change in valve in the compressed air pressure through either said first or said second air inlet line and adapted to engage said first and second friction clutches upon receiving a signal from said first mechanical linkage upon actuation of said first jaw clutch and adapted to engage said first and second friction clutches upon receiving a signal from said second linkage upon actuation of said second jaw clutch, a first air pressure change delay system having a compressed air inlet and compressed air outlet and arranged to begin the discharge of compressed air from said outlet a predetermined time interval after there has been a predetermined change in value in air pressure at its inlet (timer III) with its outlet adapted to be connected to said first air actuated jaw clutch, a second air pressure change delay system (timer IV) with its outlet adapted to be connected to said air operated brakes, a third air pressure change delay system having a compressed air inlet and compressed air outlet and arranged to begin the discharge of compressed air from said outlet a predetermined time interval after there has been a predetermined change in value in air pressure at its inlet (timer VI) with its outlet connected with the inlet of said second air presure change delay system having a compressed air inlet and compressed air outlet and arranged to begin the discharge of compressed air from said outlet a predetermined time interval after there has been a predetermined change in air pressure at its inlet, a fourth air signal delay system (timer II) with its outlet adapted to be connected with said second air actuated jaw clutch, a first air pressure change delay system having a compressed air inlet and compressed air outlet and arranged to begin the discharge of compressed air from said outlet a predetermined time interval after there has been a predetermined change in value in air pressure at its inlet (timer V) with its outlet connected with the inlet of said second air pressure change delay system, a first manifold 130 connecting in parallel the first inlet of said compressed air actuating means, the inlet of said first air pressure change delay system and the inlet of said third air pressure change delay system and a second manifold 129 connecting in parallel the second inlet of said compressed air actuated means, the inlet of said fourth air pressure change delay system and the inlet of said fifth air pressure change delay system.

2. A device in accordance with claim 1 in which a compressed air operated linkage (nudger 43) for giving angular movement to an engaging section of each of said first and said second jaw clutches is mounted in said power receiving and transmitting unit A and in which a sixth air signal delay system having a compressed air inlet and compressed air outlet and arranged to begin the discharge of compressed air from said outlet a predetermined time interval after there has been a predetermined change in value in air pressure at its inlet (timer VIII) has its outlet connected with the inlet of said air operated linkage and its inlet connected with the outlet of said first air signal delay system (timer III) and in which a seventh air signal delay system having a compressed air inlet and compresesd air outlet and arranged to begin the discharge of compressed air from said outlet a predetermined time interval after there has been a predetermined change in value in air pressure at its inlet (timer VII) has its outlet connected with the inlet of said air operated linkage and its inlet connected to the outlet of said fourth air signal delay system (timer II).

3. A device in accordance with claim 2 in which a first S and a second R hand operated valve are each provided with a first outlet and a second outlet and in which said first outlets are connected to said first manifold and in which said second outlets are connected to said second manifold.

4. A compressed air actuating system for controlling the operation of a power producing and transmitting system which has first F, second E and third D prime movers, a compound unit A having first 19, second 18 and third 17 shafts, connected respectively to said first, second and third prime movers through first 16, second 15 and third 14 air operated engine friction clutches, a power transmitting means including a first jaw clutch J mounted on said first shaft mechanically connecting said first shaft to said second shaft, power transmitting means including a second jaw clutch K mounted on said second shaft for transmitting power from said second shaft to said third power input shaft, a first pump H, power transmitting means including a first air operated pump clutch 32 mechanically connecting said first pump H to said first shaft of the compound unit, a second pump G, power transmitting means including a second air operated friction pump clutch 29 mechanically connecting said second pump to said second shaft of the compound unit, a reverse unit B mechanically connected to the third shaft of the compound unit and having an air operated forward friction clutch U, said compressed air actuating system comprising, in combination a first hand operated compressed air valve S having a first outlet 369 and a second outlet 361 with conduits adapted to connect the first outlet with the second air operated friction pump clutch and the first air operated jaw clutch in the compound unit and conduits adapted to connect the second outlet with the first air operated friction pump clutch, a second hand operated compressed air valve R having a first 330 and second 331 outlet with conduits adapted to connect its first outlet with the second air operated friction pump clutch and conduits adapted to connect its second outlet with said first air operated friction pump clutch and a first compressed air operated jaw clutch in the compound unit, a third hand operated compressed air valve Q having a first 300 and second 301 outlet with conduits adapted to connect its first outlet with said second compressed air friction pump clutch and the second compressed air operated jaw clutch in the compound unit and conduits adapted to connect the second outlet with the first air operated friction pump clutch and with the first and second air operated jaw clutches in the compound unit, a first throttle valve N, conduits adapted to connect said first throttle valve with the throttle of the first prime mover and with the air operated clutch of the reverse unit and with the operating mechanism of air controlled normally closed valves mounted in the conduits adapted to connect the first and second outlets of said first hand operated compressed air valve with said second and first air operated friction pump clutches respectively, a second throttle valve M, conduits adapted to connect said second throttle valve with the air operated clutch of said reverse unit and with the operating mechanism of air controlled normally closed valves mounted in the conduits adapted to connect the first and second outlets of said second hand operated compressed air valve with the second and first air-operated friction pump clutches respectively, a third throttle valve L, conduits adapted to connect said third throttle valve with said third prime mover and with the air-operated clutch of said reverse unit and with the control mechanism of air controlled normally closed valves mounted in the conduits adapted to connect the first and second outlets of said third hand operated compressed air valve with the second and first air operated friction pump clutches respectively.

5. A device in accordance wtih claim 4 in which the outlet of the third throttle valve L is connected to branched lines adapted to connect to the throttles of the first F and second E prime movers and in which the branched line adapted to connect it to the second prime mover is controlled by a normally open air controlled valve 24 having its central mechanism connected to the first and second outlets of the second hand 121 and third L hand operated compressed air valves and in which the branched line adapted to connect said third throttle valve with the first prime mover is controlled by a normally open air controlled valve 245 having its control mechanism connected with the first and second inlets of the first N and third L hand operated compressed air valves.

6. A compressed air actuating system for operating a power receiving and transmitting unit having a rotating shaft on which is mounted a jaw clutch which is actuated by a first reciprocating compressed air motor and which has a prime mover connected to said shaft by a friction clutch actuated by a second reciprocating compressed air motor comprising, in combination, a compressed air valve having a compressed air actuating means mounted at the inlet of said second reciprocating compressed air motor for controlling the air supply thereto for disengaging and for engaging said friction clutch, an air pressure change delay system having a compressed air inlet and compressed air outlet arranged to begin the discharge of compressed air from said outlet a predetermined time interval after there has been a predetermined change in value in the air pressure at its inlet, a hand controlled valve fluidly connected to the air actuating means of said compressed air valve and to the inlet of said pressure change delay system and means fluidly connecting the outlet of said air signal delay system with said first reciprocating compressed air motor.

7. A compressed air actuating system for operating a power receiving and transmitting unit having a rotating shaft on which is mounted a jaw clutch actuated by a first reciprocating compressed air motor and a brake actuated by a second reciprocating compressed air motor and which has a prime mover connected to said shaft by a friction clutch actuated by a third reciprocating compressed air motor comprising, in combination, a compressed air valve having a compressed third reciprocating compressed air motor actuating means mounted at the inlet of said air for controlling the compressed air supplied thereto for disengaging and engaging said friction clutch, a first air pressure change delay system having a compressed air inlet and compressed air outlet arranged to begin the discharge of compressed air from said outlet a predetermined time interval after there has been a predetermined change in value in the air pressure at its outlet, a second air pressure change delay system having a compressed air inlet and compressed air outlet arranged to begin the discharge of compressed air from said outlet a predetermined time interval, a greater than the predetermined time interval of said first air pressure change delay system after there has been a predetermined change in value in air pressure at its inlet, a manually operated valve, a manifold fluidly connecting the air actuating means of said compressed air valve, the inlet of said first air pressure change delay system and the inlet of said second air pressure change delay system, means fluidly connecting the outlet of said first air pressure change delay system to the inlet of said second reciprocating compressed air motor and means fluidly connecting the outlet of said second air signal delay system to the inlet of said first reciprocating compressed air motor.

8. A compressed air actuating system for operating a power receiving and transmitting unit having a rotating shaft on which is mounted a jaw clutch actuated by a first reciprocating compressed air motor and a brake operated by a second reciprocating compressed air motor and which has a prime mover connected to said shaft by a friction clutch operated by a third reciprocating compressed air motor comprising, in combination, a compressed air actuated means provided with a mechanical linkage operated by said jaw clutch for causing said third reciprocating compressed air motor to move in a first direction upon receiving a pressure change through its inlet line and for moving said third reciprocating compressed air motor in a second direction upon receiving a mechanical impulse from said mechanical linkage, first, second and third air pressure change delay systems with each of said systems having a compressed air inlet and compressed air outlet arranged to begin the discharge of compressed air through said outlet a predetermined time interval after there has been a predetermined change in value in air pressure at its inlet, said first air pressure change delay system having its outlet connected to said first reciprocating compressed air motor, said second air pressure change delay system having its outlet connected to said second reciprocating compressed air operated motor, said third pressure change delay system having its outlet connected to the inlet of said second pressure change delay system and a manifold connecting in parallel an inlet of said compressed air actuated means, the inlet of said first air pressure change delay system and the inlet of said third air pressure change delay system.

9. A compressed air actuating system for operating a power receiving and transmitting unit having a rotating shaft upon which is mounted a jaw clutch actuated by a first reciprocating compressed air motor and a brake actuated by a second reciprocating compressed air motor and which has a prime mover connected to said shaft by a friction clutch operated by a third reciprocating compressed air motor and which has a linkage for giving angular movement for one engaging section of the jaw clutch actuated by a fourth reciprocating compressed air motor comprising, in combination, means provided with a mechanical linkage operated by said jaw clutch for causing said third reciprocating compressed air motor to move in a first direction upon receiving a pressure change through a compressed air inlet line and for moving said third reciprocating compressed air motor in a second direction upon receiving a mechanical impulse from said mechanical linkage, a first, second, third and fourth air pressure change delay systems with each of said systems having a compressed air inlet and compressed air outlet arranged to begin the discharge of compressed air through said outlet a predetermined time interval after there has been a predetermined change in value in air pressure at its inlet, said first air pressure change delay system having its outlet connected to said first reciprocating compressed air motor, said second air pressure change delay system having its outlet connected to said second reciprocating compressed air operated motor, said third pressure change delay system having its outlet connected to the inlet of said second pressure change delay system, and said fourth air pressure change delay system having its outlet connected to said fourth reciprocating compressed air motor and its inlet connected to the outlet of said first air pressure change delay system and a manifold connecting in parallel an inlet of said compressed air actuated means, the inlet of said first air pressure change delay system and the inlet of said third air presure change delay system.

References Cited in the file of this patent

UNITED STATES PATENTS

| Number | Name | Date |
|---|---|---|
| 2,143,147 | Ferris | Jan. 10, 1939 |
| 2,151,153 | Rode et al. | Mar. 21, 1939 |
| 2,175,152 | Hey | Oct. 3, 1939 |
| 2,180,724 | Sheldon | Nov. 21, 1939 |
| 2,186,999 | Stone et al. | Jan. 16, 1940 |
| 2,214,201 | Moulder | Sept. 10, 1940 |
| 2,282,597 | Archer | May 12, 1942 |
| 2,360,753 | Anderson | Oct. 17, 1944 |
| 2,502,969 | Maier | Apr. 4, 1950 |
| 2,541,625 | Webster | Feb. 13, 1951 |